United States Patent Office

3,526,516
Patented Sept. 1, 1970

3,526,516
CULINARY COMPOSITION CONTAINING
LIPOPHILIC POLYVINYL PYRROLIDONE
Norman B. Howard, Hamilton, Ohio, and Henry Schneider, Ottawa, Ontario, Canada, assignors to The Procter & Gamble Company, Cincinnati, Ohio, a corporation of Ohio
No Drawing. Filed Nov. 13, 1967, Ser. No. 682,531
Int. Cl. A21d *13/08, 2/00*
U.S. Cl. 99—94　　　　　　　　　　　　　　　　　6 Claims

ABSTRACT OF THE DISCLOSURE

Prevention of silicone caused failures in baked cakes by adding to the culinary mix about 0.05 to about 3.0% of a lipophilic polyvinyl pyrrolidone.

BACKGROUND OF THE INVENTION

Prepared cake mixes employed for baking are generally made by combining a sugar, farinaceous materials, shortening and other ingredients, including leavening, milk solids, egg solids, flavoring and coloring to form a dry free-flowing granular mixture. To prepare these dry mixes for baking, liquid materials such as water, milk, or eggs are added to form a cake batter. The combination is beaten to form a homogenous mixture and to incorporate air in the batter. The resulting cake batter is an aerated fat in water emulsion comprised of water, fat, protein and carbohydrate materials.

One of the major problems in forming a suitable cake batter is the incorporation and maintenance of gas, for example, air or carbon dioxide, in the batter in the form of small bubbles to form a stable foam. These gas bubbles are covered by the continuous (aqueous) phase of the emulsion, and the emulsion is thought to be stabilized by soluble protein present in the cake batter. This protein can be contributed by farinaceous material, eggs, milk and other ingredients present in the batter. During baking the entrapped gas bubbles serve as nuclei for expansion of water vapor to give the cake its height and light flaky texture. Under optimum conditions of batter stability, a large number of small bubbles are present in the batter at the time of thermal setting producing a very desirable cake with a fine grain structure, and few, if any, large holes in the final cake product. These optimum conditions require an extremely stable cake batter to hold the many small gas bubbles as discrete cells and prevent coalescence which would form a larger more undesirable grain structure in the baked cake. In an extremely unstable cake batter the air bubbles coalesce and escape from the batter, and the batter collapses in the oven to produce a cake which is a total failure.

High molecular weight siloxane polymers (hereinafter referred to as "silicones" as they are more commonly known) are appearing with more and more frequency in cake batters. This can be attributed to the increasing use of silicones in greases and seals on food processing and handling aequipment. Also, silicones are used as additives and processing aids in many food products (shortenings, fruit juices and flavorings among others) and as coatings and lubricants on kitchen utensils and appliances. Silicones are often inadvertently introduced into a cake batter from sources such as these, and from other sources.

The presence of very minute amounts of silicones in a cake batter produces an undesirable baked cake product, and in many instances, a baked cake product which is a total failure. Such failure has been found to occur when the silicone comprises as little as about 4 to 5 p.p.m. by weight of the cake batter (approximately 0.005 gram of silicones in a conventional two-layer cake batter). While the exact mechanism whereby the silicones adversely affect cake batters is not known, it is believed that silicones can affect the batter in either of two ways: First, silicones present in the aqueous phase of the cake batter emulsion might migrate to the aqueous-gas interface and destroy or disrupt the stabilizing effect of protein in the cake batter, allowing bubbles in the batter to coalesce to form larger bubbles and ultimately escape from the cake batter; or secondly, in either the aqueous or oil phase of the cake batter, silicones might migrate to the oil-aqueous interface disrupting or destroying the emulsion allowing the oil, a known defoamer, to reach the aqueous-gas interface and produce the same result described above.

Many conventional additives have been tried to stabilize cake batters sufficiently to prevent silicone-caused failures. Examples of such materials which have been tried are gum tragacanth, gum karaya, locust bean gum, carrageen and polyvinylpyrrolidone. These materials have been deficient in two respects: First, to prevent total failure they must be used in such large amounts, for example, 5% by weight of the dry cake mix ingredients, that desirable cake formulation is hampered; and secondly, even at levels where total failure is prevented, these additives are not sufficiently effective in preventing coalescence of the bubbles in the cake batter with the result that cakes with large undesirable grain structures are produced.

SUMMARY OF THE INVENTION

It has now been found that silicone-caused failures in the baking of cakes can be prevented by incorporating in a culinary composition comprising cake ingredients from about 0.05% to about 3.0%, preferably from about 0.1% to about 1.5%, of a lipophilic polyvinylpyrrolidone. Cake ingredients include sugar, shortening and farinaceous ingredients, and can include any of a number of other ingredients as is more fully discussed below. The lipophilic polyvinylpyrrolidone is a derivative of conventional water soluble polyvinylpyrrolidone wherein the polyvinylpyrrolidone has been alkylated, with alkyl groups having from about 12 to about 24 carbon atoms, thereby providing a compound with a lipophilic character.

More specifically, this invention provides a culinary composition comprising sugar, farinaceous material, shortening, and from about 0.05% to about 3.0% of a lipophilic polyvinylpyrrolidone comprising a polymeric chain of individual vinylpyrrolidone units of the formula

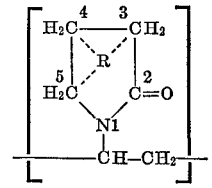

wherein R represents an alkyl group with from about 12 to about 24 carbon atoms which is attached to a portion of said vinylpyrrolidone units at any of positions 3, 4, and 5, the mole ratio of said vinylpyrrolidone units to said alkyl groups being from about 20:1 to about 5:1, the molecular weight of said lipophilic polyvinylpyrrolidone being from about 3,000 to about 40,000.

DISCUSSION OF THE INVENTION AND ITS PREFERRED EMBODIMENTS

The culinary compositions disclosed herein must contain sugar, farinaceous material and shortening in addition to the lipophilic polyvinylpyrrolidone described above. They can be prepared for commercial use in the form of a dry mix, an aqueous batter, or a baked cake. Dry mixes are preferred. Additional ingredients such as milk solids, hydrophilic colloids, leavening, water, and flavors are added to provide specific product properties or characteristics in the final product.

The lipophilic polyvinylpyrrolidone is a derivative of polyvinylpyrrolidone. As is well known in the art, polyvinylpyrrolidone is prepared by polymerizing N-vinyl pyrrolidone, using any of the well known conventional catalysts such as peroxides, ultraviolet light and heat to form polymers of various molecular weight. Polymers can be formed, for example, having molecular weights of from about 2000 to about 300,000. Lipophilic polyvinylpyrrolidone is polyvinylpyrrolidone alkylated with various ratios of polyvinylpyrrolidone and α-olefin. The particular lipophilic polyvinylpyrrolidone useful in this invention is a polymeric chain of individual vinyl pyrrolidone units of the formula

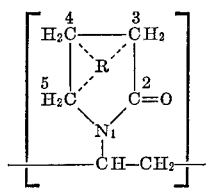

wherein R is an alkyl group with from about 12 to about 24 carbon atoms attached to a portion of said vinylpyrrolidone units at any of positions 3, 4, and 5, the ratio of said vinylpyrrolidone units to said alkyl groups being from about 20:1 to about 5:1, the molecular weight of said lipophilic polyvinylpyrrolidone being from about 3,000 to about 40,000. Preferably, the alkyl groups contain from about 16 to about 22 carbon atoms and the molecular weight is from about 10,000 to about 40,000, most preferably about 20,000.

Suitable sugars include any of the commonly used granular sugars such as sucrose, dextrose, maltose, fructose, lactose, brown and invert sugars, and corn syrup solids. The sugar can also be in powder form and mixtures of more than one type of sugar can be used.

Suitable farinaceous materials include flour. The flour can be the usual bleached cake flour although a good general purpose flour can be substituted for such cake flour especially if appropriate emulsifiers are provided in the shortening. The ratio of sugar to flour can be adjusted as necessary for special circumstances but a ratio of sugar to flour in excess of 1:1 has long been known to result in particularly good cake mixes which are often referred to as "high-ratio" cakes. Cakes in which the ratio of sugar to flour is less than about 1:1 are also quite satisfactory, and are generally referred to as "low-ratio" cakes.

The shortenings which can be employed in the culinary compositions of this invention include solid or plastic as well as liquid or semi-fluid glyceride shortenings derived from animal, vegetable or marine fats and oils including synthetically prepared shortenings. These glycerides can contain saturated or unsaturated "long-chain" acyl radicals having from about 12 to about 22 carbon atoms such as lauroyl, lauroyleoyl, myristoyl, myristoleoyl, palmitoyl, palmitoleoyl, stearoyl, oleoyl, linoleoyl, linolenoyl, arachidoyl, arachidenoyl, behenoyl, erucoyl and the like and are generally obtained from edible oils and fats such as cottonseed oil, soybean oil, coconut oil, rapeseed oil, peanut oil, olive oil, palm oil, palm kernel oil, sunflower seed oil, rice bran oil, corn oil, sesame seed oil, safflower oil, wallflower oil, pilchard oil, lard, tallow and the like. These glycerides can also contain in part one or two short-chain acyl groups having from 2 to about 6 carbon atoms such as acetyl, propanoyl, butanoyl, valeryl, and capropyl; they can be prepared by random or low temperature interesterification reactions of fatty triglyceride-containing oils and fats such as interesterified or rearranged cottonseed oil and lard; and they can be otherwise formed by various organic syntheses.

Preferably, the shortening should be of the so-called emulsified variety, containing up to 50%, and more normally from about 3% to about 25%, by weight, of one or more suitable emulsifiers. The partially esterified polyhydric compounds having surface active properties are an example of appropriate emulsifiers. This class of emulsifiers includes, among others, mono- and diglycerides of fatty acids, such as monobehenin, monostearin, monopalmitin, monoolein, and dipalmitin; partial fatty acid esters of glycols, such as propylene glycol monostearate and monobehenate; higher fatty acid esters of sugars, such as the partial palmitic and oleic esters of sucrose; and sulfuric and phosphoric acid esters such as dodecyl glyceryl ether sulfate and monostearin phosphate. Other examples are the partial esters of hydroxy carboxylic acids, such as lactic, citric, and tartaric acids, with polyhydric compounds, for example, glycerol lactopalmitate, and the polyoxyethylene ethers of fatty esters of polyhydric alcohols, such as a polyoxyethylene ether of sorbitan monosterate or distearate. Fatty acids alone or esterified with a hydroxy carboxylic acid, e.g., stearyl-2-lactylate, are also useful.

Preferably, the emulsifier is any one or a combination of the various alpha phase crystal tending emulsifiers disclosed in U.S. Pats. 3,145,107; 3,145,108 and 3,145,109 issued to Howard on Aug. 18, 1964 and in U.S. Pat. 3,145,110 issued to Abbott on Aug. 18, 1964. Examples of such alpha phase crystal tending emulsifiers are propylene glycol monostearate, acetylated mono- or di-glycerides.

Another ingredient which is preferably used in conjunction with the shortening of these culinary compositions is a high temperature batter stabilizer such as stearic acid, malic stearate, and octadecyl hydrogen succinate or any of the high temperature batter stabilizers which are disclosed in U.S. Pats. 3,145,107; 3,145,108; 3,145,109; 3,145,110 and are also disclosed in U.S. Pat. 3,168,405 issued to Howard and Martin on Feb. 5, 1965. The high temperature batter stabilizer is preferably used in an amount of from about 0.25% to about 4.0% by weight of the shortening.

The selection of a chemical leavening system from among those known in the art poses no problem for one skilled in the formulation of culinary compositions. In general such systems are composed of baking soda, e.g., sodium, potassium, or ammonium bicarbonate, on the one hand, and one or more phosphates or other common baking acids on the other. Suitable baking acids include monocalcium phosphate, dicalcium phosphate, sodium acid pyrophosphate, potassium acid tartrate, monosodium phosphate, sodium aluminum phosphate, and sodium aluminum sulfate, amony others. The amount of soda and the selected acid are so balanced as to achieve a pH in the resultant batter of about 6 to 10. Frequently, provision of a slight excess of soda is advantageous so as to assure absence of unreacted acid or to compensate for the acid tendency of some batter ingredients.

In many culinary compositions it is accepted practice for the housewife to add the required amount of eggs in the course of batter preparation and this practice can be followed just as well in the present compositions. If desired, the inclusion of egg solids in the composition is an allowable alternative. The function and permissible variations in the remaining ingredients aer sufficiently apparent to render the detailed explanation thereof unnecessary.

It is to be understood that a wide variety of cakes can be prepared from culinary compositions which contain the above named ingredients. The composition of the dry mixes of this invention which are suitable for baking cakes can vary but representative compositions are within the following ranges:

| Ingredient: | Percent by wt. dry mix |
|---|---|
| Lipophilic polyvinylpyrrolidone (hereinbefore specified) | 0.05–3.0 |
| Flour | 20–50 |
| Sugar | 20–70 |
| Shortening | 4–26 |

| | |
|---|---|
| Leavening agents | 0.5–4 |
| Egg solids | 0–5 |
| Hydrophilic colloids | 0–1 |
| Non-fat dried milk solids | 0–5 |
| Cocoa | 0–10 |
| Flavoring (including spices) | 0–2 |
| Coloring | Minor amounts |

The exact method of compounding the culinary compositions of this invention in the form of a dry mix is not critical, although very satisfactory results are obtained by mixing in a ribbon blender. It is preferred that the flour, sugar, and shortening, be blended into a homogeneous premix. This premix can be passed through an impact grinder to eliminate lumps. Additional ingredients can then be added and the whole again mixed. An additional step of impact grinting may be desirable to remove any lumps present in the final dry culinary composition.

Another method of preparing the culinary composition is by the method disclosed in U.S. Pats. 2,874,051 issued to Bendenk et al., 2,874,052 issued to Bedenk, and in 2,874,053 issued to Mills on Feb. 17, 1959 in which a homogeneous blend is formed containing sugar, flour and shortening, and this blend is then subjected to simultaneous shearing and crushing forces.

The manner in which the essential ingredient of the invention, i.e., the lipophilic polyvinyl pyrrolidone, hereinbefore specified, is added to the composition is not critical, so long as it is mixed with the other components. Thus, the lipophilic polyvinylpyrrolidone can be added to the sugar-flour-shortening premix during the blending thereof. Equally satisfactory is the addition of these ingredients, together or separately, to other components before the addition thereof to the sugar, flour, and shortening.

The following examples describe with particularity several of the preferred embodiments of the invention described hereinbefore. It will be obvious to those skilled in the art that the invention can be performed in numerous other ways. These examples are, therefore, given by way of additional illustration and not by way of limitation.

EXAMPLE I

Six apricot flavored recipe cakes were prepared in the following manner.

A culinary composition in the form of a dry yellow cake mix was prepared by thoroughly blending together sugar, flour and shortening in a conventional heavy duty mixer, and passing this blend through a standard roller mill. After the milling step, the minor ingredients shown below in addition to the sugar, flour and shortening were added. The mixture was then subjected to impact grinding to break up any agglomerates or large particles present. This dry yellow cake mix had the ingredients indicated.

Yellow cake mix

| Ingredients: | Parts by wt. |
|---|---|
| Sugar, industrial fine granulated sucrose | 45.5 |
| Cake flour | 39.0 |
| Shortening (a mixture of vegetable oil and directly rearranged lard, hydrogenated to an I.V. of about 55 with 3% by weigh of lactostearin, an emulsifier) | 11.7 |
| Dry milk solids | 0.2 |
| Salt | 0.5 |
| Soda | 1.3 |
| Sodium acid pyrophosphate | 0.3 |
| Carboxymethyl cellulose | 0.3 |
| Flavor | 1.2 |
| | 100.0 |

This yellow cake mix was divided into portions each of which weighed about 538 grams.

An apricot flavored recipe cake was prepared utilizing one portion of the above yellow cake mix by adding 4 whole eggs (about 192 grams), 100 grams of sugar, 240 grams of a commercially solid apricot nectar known not to contain silicones, and 100 grams of vegetable oil. The resulting mixture of ingredients was coarsely mixed in an ordinary home mixer operating at low speed, and then mixed in the mixer at medium speed (500 r.p.m.) for 2 minutes. The resulting batter was poured into a 10-inch tube pan and baked for about 50 minutes at 350° F. The resulting "control" cake had a cake height of 2⅝″ and a grain which was coarse but had no oil concentration at the center.

Apricot flavored recipe cakes having silicone contaminated batters were then prepared. There was mixed with portions of the above yellow cake mix the following additives:

| Portion | Ingredient | Weight (grams) | Percent of mix |
|---|---|---|---|
| 1 | None | 0.0 | 0.0 |
| 2 | Gum Tragacanth | 27.0 | 5.0 |
| 3 | Locust Bean Gum | 27.0 | 5.0 |
| 4 | Gum Karaya | 13.5 | 2.5 |
| 5 | Carrageenin | 27.0 | 5.0 |
| 6 | Polyvinylpyrrolidone (molecular weight 40,000). | 3.0 | 0.6 |
| 7 | do | 6.0 | 1.1 |
| 8 | do | 12.0 | 2.2 |
| 9 | Lipophilic Polyvinyl-pyrrolidone* | 1.1 | 0.2 |

*Polyvinylpyrrolidone wherein the N-vinylpyrrolidone units have been alkylated with alkyl groups containing about 16 carbon atoms (the mole ratio of said vinylpyrroloidone units to said alkyl groups being about 12:1) having a molecular weight of about 19,000, and characterized herein as lipophilic polyvinyl pyrrolidone. Sold under the trade name "Ganex 816" by General Aniline and Film Corporation.

Apricot flavored recipe cakes were prepared utilizing the above yellow cake mix by adding to each of these portions 4 whole eggs (about 192 grams), 100 grams of sugar, 240 grams of a commercially sold apricot nectar known to contain about 0.04% silicones, and 100 grams of vegetable oil. The resulting mixture of ingredients was coarsely mixed in an ordinary home mixer operating at low speed, and then mixed in the mixer at medium speed (500 r.p.m.) for 2 minutes. The resulting batter was poured in a 10-inch tube pan and baked for about 50 minutes at 350° F.

The resulting cakes had the following properties:

| Number | Additive | Cake height (in.) | Grain |
|---|---|---|---|
| 1 | None | 1¾ | Coarse grain with heavy oil concentration at center. |
| 2 | Gum Tragacanth | 2⅝ | Coarse grain with scattered oily areas throughout. |
| 3 | Locust Bean Gum | 2½ | Do. |
| 4 | Gum Karaya | 2½ | Do. |
| 5 | Carrageenin | 2⅝ | Do. |
| 6 | Polyvinylpyrrolidone | 1¾ | Coarse grain. |
| 7 | do | 1⅞ | Do. |
| 8 | do | 2⅝ | Fine grain. |
| 9 | Lipophilic polyvinyl-pyrrolidone. | 2¾ | Very fine (pound cake-like) grain. |

Cake number 8 was the additive lipophilic polyvinylpyrrolidone had superior height and had especially desirable grain properties. These desirable results were obtained with very small amounts of the additive. The other conventional additives tabulated above did not have these desirable effects on cake properties. In particular it was noted that polyvinylpyrrolidone when used at low levels is not effective in preventing failures in baked cake products prepared from silicone contaminated batters.

EXAMPLE II

When in Example I the lipophilic polyvinyl pyrrolidone has a molecular weight of about 30,000 substantially the same results are obtained in that a delectable cake with good height and fine grain is obtained.

EXAMPLE III

When in Example I the lipophilic polyvinylpyrrolidone has alkyl groups containing about 20 carbon atoms, substantially the same results are obtained in that a delectable cake with good cake height and fine grain structure is obtained.

What is claimed is:

1. A culinary composition comprising sugar, farinaceous material, shortening, and from about 0.05% to about 3.0% of a lipophilic polyvinylpyrrolidone comprising a polymeric chain of vinylpyrrolidone units of the formula

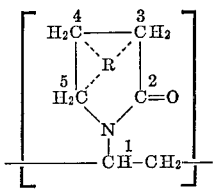

wherein R represents an alkyl group with from about 12 to about 24 carbon atoms which is attached to a portion of said vinylpyrrolidone units at any of positions 3, 4, and 5, the ratio of said vinylpyrrolidone units to said alkyl groups being from about 20:1 to about 5:1, and the molecular weight of said lipophilic polyvinylpyrrolidone being from about 3,000 to about 40,000.

2. The culinary composition of claim 1 wherein the lipophilic polyvinylpyrrolidone has alkyl groups containing from about 16 to about 22 carbon atoms.

3. The culinary compositions of claim 2 wherein the lipophilic polyvinylpyrrolidone has a molecular weight of from about 10,000 to about 40,000.

4. The process of preventing silicone caused failures in baked cake products comprising adding to a culinary composition comprising sugar, farinaceous material, and shortening from about 0.05% to about 3.0% of a lipophilic polyvinylpyrrolidone comprising a polymeric chain of vinylpyrrolidine units of the formula

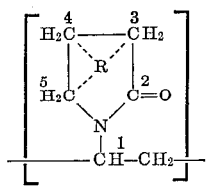

wherein R represents an alkyl group with from about 12 to about 24 carbon atoms which is attached to a portion of said vinylpyrrolidone units at any of positions 3, 4, and 5, the ratio of said vinylpyrrolidone units to said alkyl groups being from about 20:1 to about 5:1, and the molecular weight of said lipophilic polyvinylpyrrolidone being from about 3,000 to about 40,000.

5. The process of claim 4 wherein the lipophilic polyvinylpyrrolidone has alkyl groups containing from about 16 to about 22 carbon atoms.

6. The process of claim 4 wherein the lipophilic polyvinylpyrrolidone has a molecular weight of from about 10,000 to about 40,000.

References Cited

UNITED STATES PATENTS 3,153,595   10/1964   Tiedemann _____ 99—94

RAYMOND N. JONES, Primary Examiner

U.S. Cl. X.R.

99—92